(12) United States Patent
McKay et al.

(10) Patent No.: US 6,466,141 B1
(45) Date of Patent: Oct. 15, 2002

(54) SKEW DETECTION SYSTEM

(75) Inventors: Richard John McKay, Brewood; David John Langford, Coven; Stephen Harlow Davies, Horsehay, all of (GB)

(73) Assignee: Lucas Industries Limited (GB)

( * ) Notice: Subject to any disclaimer, the term of this patent is extended or adjusted under 35 U.S.C. 154(b) by 18 days.

(21) Appl. No.: 09/669,823

(22) Filed: Sep. 26, 2000

(30) Foreign Application Priority Data

Sep. 28, 1999 (GB) ............................................. 9922790
Oct. 13, 1999 (GB) ............................................. 9924111

(51) Int. Cl.[7] ............................................. G08B 23/00
(52) U.S. Cl. ....................... 340/963; 244/213; 340/686; 340/945
(58) Field of Search ................................ 340/945, 963, 340/686; 701/14, 3, 9; 244/76 A, 89, 90 R, 1 R, 213, 217; 464/23; 324/207.13; 318/584

(56) References Cited

U.S. PATENT DOCUMENTS

| 2,834,010 | A | | 5/1958 | Sieradzki |
| 3,169,178 | A | | 2/1965 | Notchev et al. |
| 3,935,754 | A | * | 2/1976 | Comollo ..................... 74/664 |
| 5,628,477 | A | * | 5/1997 | Caferro et al. ............... 244/214 |
| 5,680,124 | A | | 10/1997 | Bedell et al. ................ 340/945 |
| 5,686,907 | A | * | 11/1997 | Bedell et al. ............... 340/945 |
| 6,299,108 | B1 | * | 10/2001 | Lindstrom et al. .......... 244/213 |

FOREIGN PATENT DOCUMENTS

| EP | 0 726 201 | 8/1996 |
| EP | 0 922 633 | 6/1999 |

* cited by examiner

Primary Examiner—Brent A. Swarthout
(74) Attorney, Agent, or Firm—Andrus, Sceales, Starke & Sawall

(57) ABSTRACT

A skew detection system for use in sensing the occurrence of a skew condition in a system having a plurality of control surfaces located adjacent one another and which, in use, are driven to move simultaneously and at the same speed as one another, the skew detection system comprising a detector arrangement extending over and movable with the surfaces, between a first location on one of the surfaces and a second location on another of the surfaces, at least part of the detector arrangement being arranged to move in the event that one or more of the surfaces becomes skewed, and a sensor arranged to permit a change in the position of the said part of the detector arrangement to be detected. In one embodiment, a skew condition can be sensed using two sensors.

14 Claims, 6 Drawing Sheets

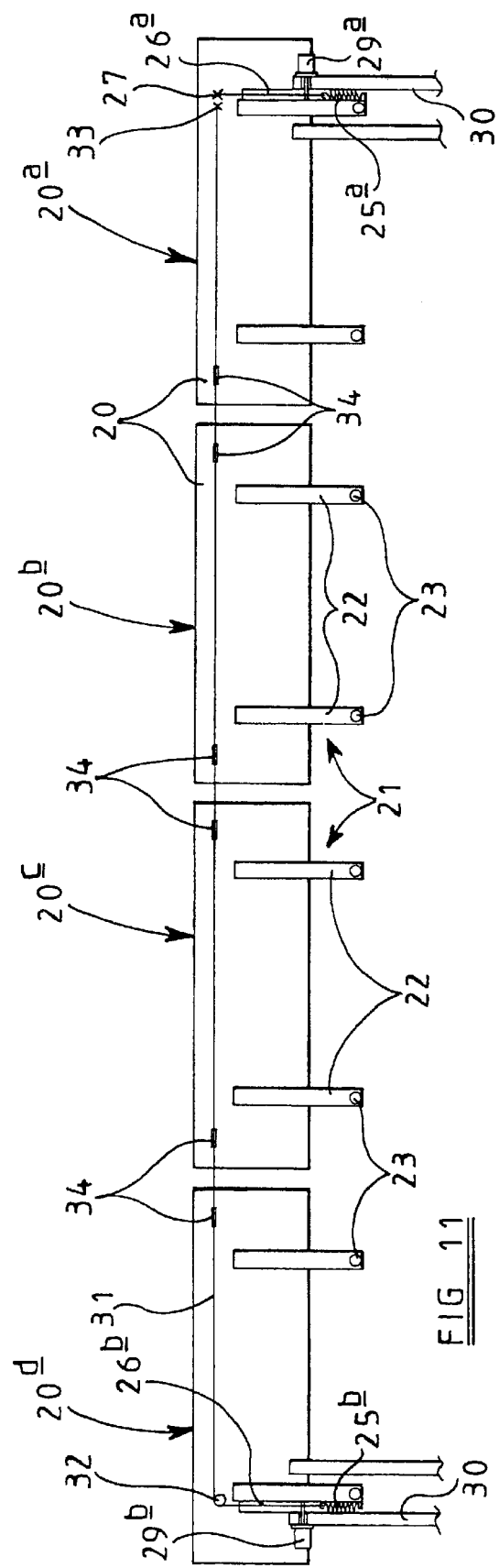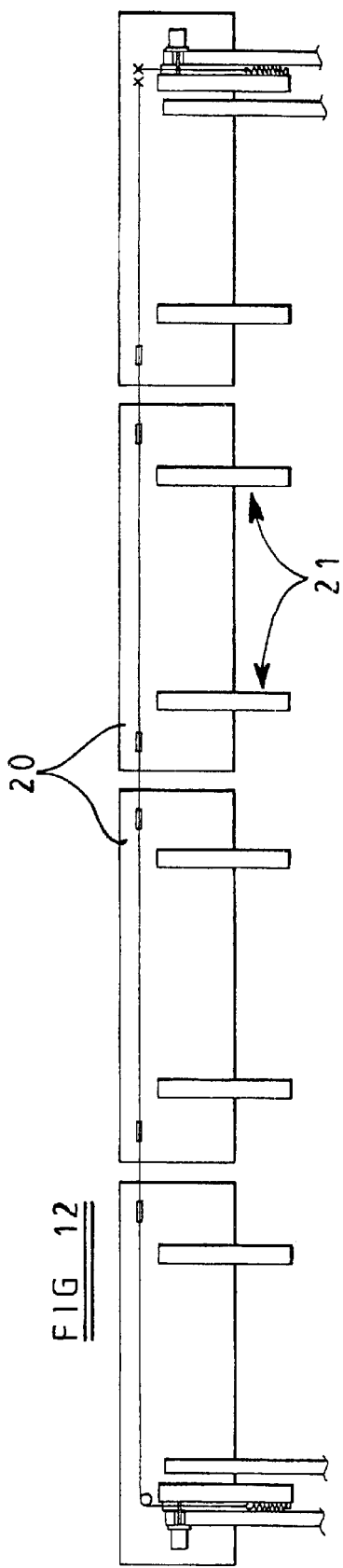
FIG 11
FIG 12

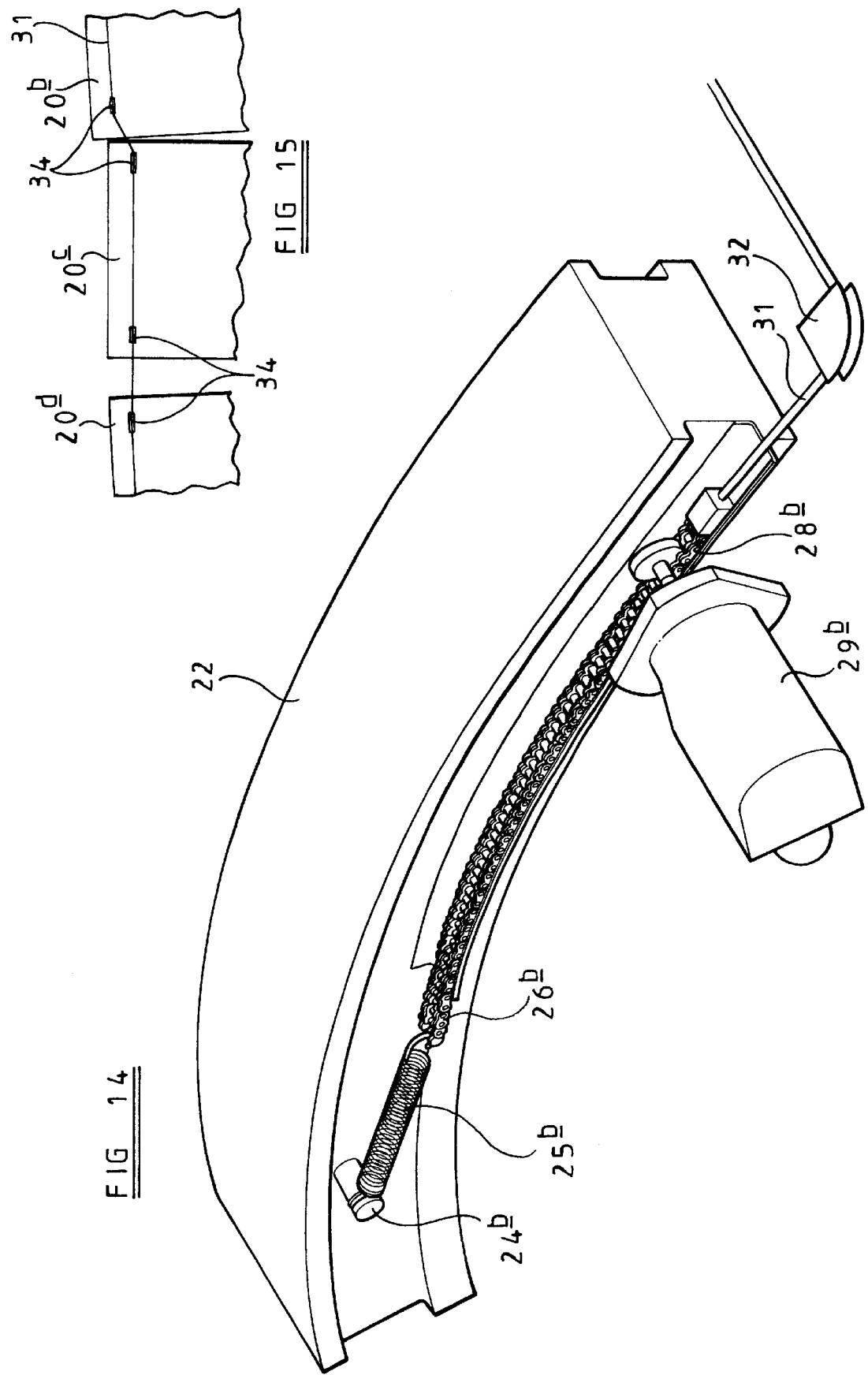

SKEW DETECTION SYSTEM

FIELD OF THE INVENTION

This invention relates to a skew detection system for use with the flaps, slats or other moveable control surfaces of an aircraft.

BACKGROUND OF THE INVENTION

FIG. 1 illustrates diagrammatically the high lift leading edge control surfaces or slats 1 of an aircraft wing. Each slat 1 is typically driven between extended and retracted positions by means of a pair of rotary actuators, the actuators being positioned adjacent opposite ends of the slat. It will be appreciated that in the event that one of the actuators of one of the slats, or the drive arrangement associated therewith, fails whilst the other continues to operate, then the slat will become skewed relative to the wing. When one or more of the control surfaces of an aircraft become skewed, then the aerodynamics of the aircraft may be adversely affected. For example, in the event that the degree of skew of a slat becomes too great, then the angle of attack which can be maintained by the wing for a given airspeed without stalling will change, and remedial action may be required to permit control of the aircraft to compensate for the presence of the skew condition. Clearly, in order to permit appropriate remedial action to be taken it is desirable to be able to detect the presence of a skew condition before the degree of skew is such that control of the aircraft is impaired, and to provide a suitable warning signal to the pilot of the aircraft.

In the arrangement illustrated diagrammatically, in FIG. 1, the wing includes five slats 1, a first one of which is located inboard of a wing mounted engine, the remaining flour slats 1 being located outboard of engine. As mentioned before, each slat 1 is driven by a pair of actuators.

FIGS. 1 to 4 illustrate the slats 1 with one of the slats in a skewed condition. The position occupied by the skewed slat depends upon which of the two actuators associated with the slat has failed and upon whether the slats were being moved towards their extended positions or towards their retracted positions at the time at which the actuator failure occurred.

SUMMARY OF THE INVENTION

It is an object of the invention to provide a system whereby a skew condition can be detected, system being of a relatively simple and convenient form. Another object of the invention is to provide a skew detection system for use with a control surface system having a plurality of control surfaces located adjacent one another, and whereby a skew condition occurring with any of the surfaces can be detected using only two sensors.

According to an aspect of the present invention there is provided a skew detection system for use in sensing the occurrence of a skew condition in a system having a plurality of control surfaces located adjacent one another and which, in use, are driven to move simultaneously and at the same speed as one another, the skew detection system comprising a detector arrangement extending over and moveable with the surfaces, between a first location on one of the surfaces and a second location on another of the surfaces, at least part of the detector arrangement being arranged to move in the event that one or more of the surfaces becomes skewed, and a sensor arranged to permit a change in the position of the said part of the detector arrangement to be detected.

The detector arrangement may comprise a plurality of elements arranged in end-to-end configuration. The elements may be provided with end surfaces having chamfered regions, the elements being arranged such that, in the event of a skew condition arising, the end surfaces of two adjacent elements slide over one another resulting in the chamfered regions of the adjacent end surfaces engaging one another, and consequently in the assembly of elements reducing in overall effective length. A compression spring may be provided to urge the elements into engagement with one another. The sensor may be positioned to monitor the position of an end one of the elements which moves when the overall effective length of the assembly changes.

Alternatively, the elements may be arranged to co-operate with one another by arrangements comprising a ball associated with one of the elements, the ball being received within a socket associated with another of the elements, the socket having a ramped side wall arranged such that, in the event of a skew condition arising, the ball rides over the ramped side wall, increasing the overall effective length of the assembly.

In another arrangement, the detector arrangement may comprise a cable extending continuously between the first and second locations and arranged such that, in the event of a skew condition occurring, the length of the cable between the first and second locations increases, the movement of a part of the cable past the sensor being monitored.

According to another aspect of the invention there is provided a skew detection system for use with a control surface system having a plurality of control surfaces located adjacent one another, the skew detection system comprising a first sensor operable to monitor the position of part of one of the surfaces, and a second sensor operable to monitor the position of part of another of the surfaces, the second sensor further being sensitive to the occurrence of a skew condition at locations between the said parts of the surfaces.

In use, where no skew condition occurs, then all of the control surfaces of the system will move substantially simultaneously, and the outputs of the first and second sensors will show that the associated parts of the surfaces have moved by the same distance. A difference in the sensed positions indicates that a skew condition has arisen, and appropriate control adjustments and warnings can be triggered.

Each sensor conveniently comprises a rotary position sensor arranged to be driven by movement of the associated surface. The position sensor may include a pinion arranged to be driven by a rack carried by the surface. The rack may comprise a chain.

The rack associated with the second sensor is preferably moveable relative to the associated control surface, such movement occurring in the event of the occurrence of a skew condition intermediate the parts of the surfaces with which the sensors are associated so that the second sensor is sensitive to the occurrence of such a skew condition.

An elongate flexible member is preferably provided, the member extending across all of the control surfaces with which the detection system is used, the member being guided adjacent the edges of each control surface, and being coupled to the rack associated with the second sensor to cause movement of the rack associated with the second sensor relative to the associated control surface in the event of a skew condition arising. The flexible member conveniently comprises a cable. The cable is conveniently guided by extending through tubular guide members located adjacent the edges of the control surfaces.

Alternatively, a plurality of members may be arranged in end-to-end configuration, the assembly of the members extending over the control surfaces the position of at least one of the members changing in the event of a skew condition, the rack being coupled to one of the members such that movement of the said member causes movement of the rack.

The skew detection system is suitable for use with a range of control surface systems, for example the slats of a high lift leading edge system or the trailing edge flaps of an aircraft wing.

BRIEF DESCRIPTION OF THE DRAWINGS

The invention will further be described, by way of example, with reference to the accompanying drawings in which:

FIG. 11 is a diagrammatic view, from beneath, of a high lift leading edge system having a skew detection system, in accordance with another embodiment of the invention associated therewith, the slats of the leading edge system occupying their extended positions;

FIG. 12 is a view similar to FIG. 11 with the slats in their retracted positions;

FIG. 14 is a perspective view of another part of the skew detection system of FIG. 11; and FIG. 15 is a diagrammatic view illustrating a skew condition in one of the slats of the system of FIG. 11.

DETAILED DESCRIPTION OF THE INVENTION

Figure 1:
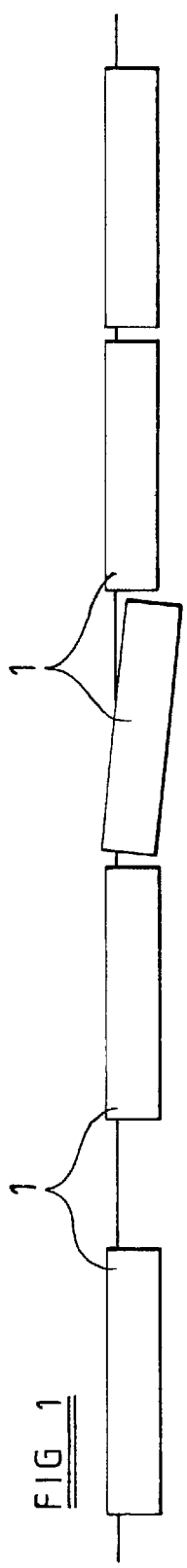
FIGS. 1 to 4 are diagrammatic views illustrating the slats of a high lift leading edge system of an aircraft wing under various skew conditions.
Figure 2:
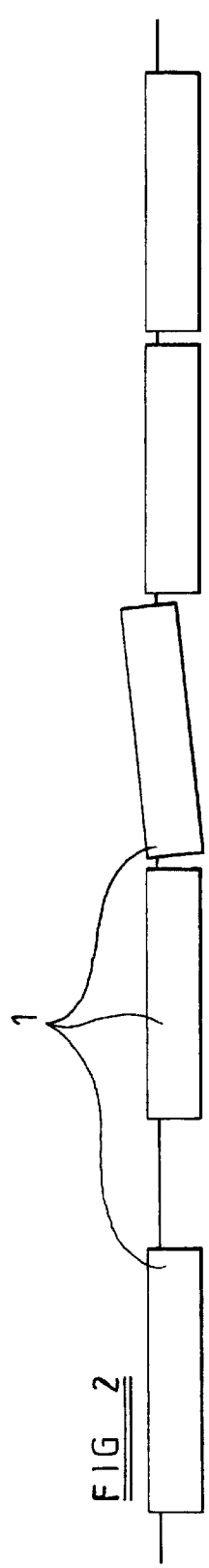
Figure 3:
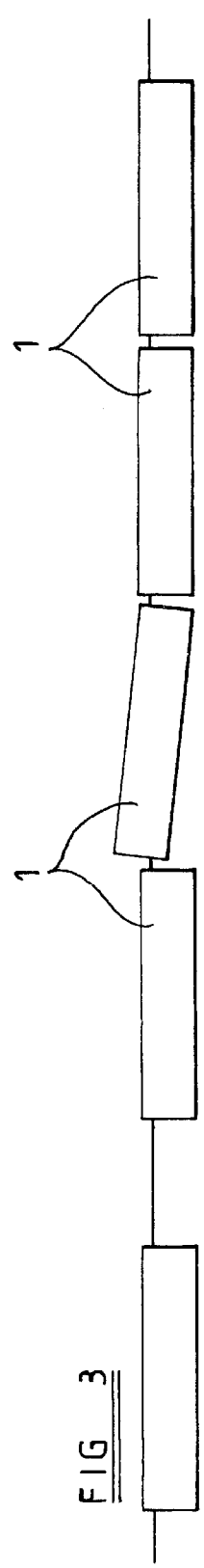
Figure 4:
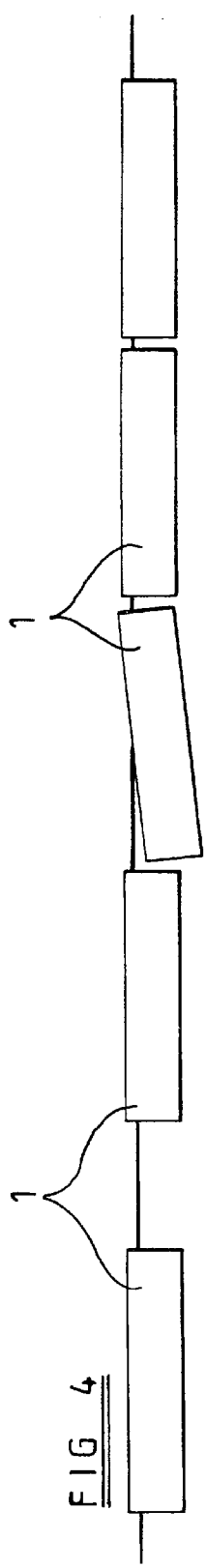
Figure 5:
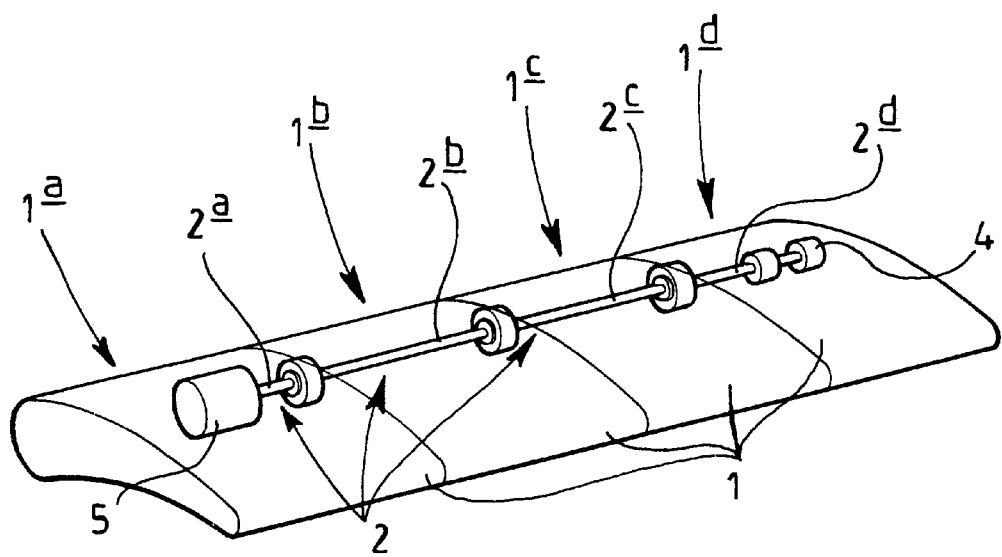
FIG. 5 illustrates, diagrammatically, four of the slats of the system of FIG. 1 and a skew detection system for detecting a skew condition in the slats.

FIG. 5 illustrates the four slats 1 of the system illustrated diagrammatically in FIG. 1 located outboard of the engine. The manner in which the slats 1 are mounted upon the aircraft wing is not of relevance to the invention and so is not illustrated and will not be described in detail. Each slat is moveable relative to the wing between an extended position and a retracted position, each slat 1 being driven between these positions by a pair of actuators. The actuators may comprise, for example, rotatory actuators. Alternatively, the actuators may comprise rack and pinion arrangements. The slats 1 are denoted herein by the reference numerals 1a, 1b, 1c and 1d. Each of the slats 1 carries a pair of brackets (not shown) having openings through which the elongate elements or bars 2 of a detector arrangement extend, the bars 2 being arranged in an end-to-end configuration and together defining an elongate assembly. In the arrangements illustrated in FIG. 5, the assembly includes four such bars 2, the bars being identified by the reference numerals 2a, 2b, 2c and 2d.

Figure 6:
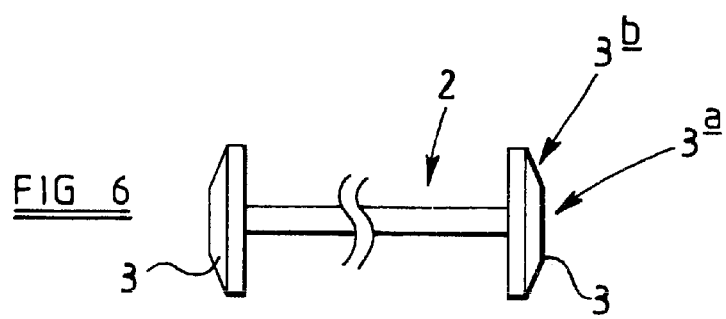
FIG. 6 is an enlarged view illustrating part of the skew detection system.

The bars 2b and 2c are substantially identical to one another and take the form illustrated in FIG. 6. As shown in FIG. 6, these bars are provided, at their ends, with enlarged diameter end plates 3. The end plates 3 could be integral with the remainder of the bars, but are conveniently separate components which are secured to the remainder of the bars by welding or any other suitable technique and which are hardened or provided with a suitable coating so as to be resistant to wear. Each end plate 3 takes the form of a disc having a flat central part 3a which is surrounded by a chamfered region 3b.

The bar 2d is provided with an end plate 3, substantially identical to the end plates 3 described hereinbefore, at one end, the other end of the bar 2d being anchored firmly to the slat 1d by an anchor arrangement 4. The manner in which the bar 2d is anchored to the slat 1d is not of importance to the invention other than that it is important to ensure that axial movement of the bar 2d is not permitted.

Figure 7:
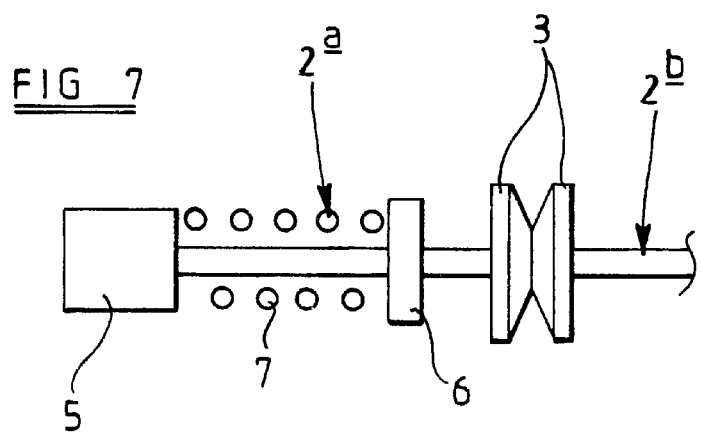
FIG. 7 is an enlarged view illustrating another part of the skew detection system.

As illustrated in FIG. 7, the bar 2a is provided, at one end, with an end plate 3, and the other end of the bar 2a extends into a position sensor 5 in the form of a transducer arranged to monitor the inductance of a coil, the inductance being dependent upon the extent to which the bar 2a or a target carried by the bar 2a extends in to the coil. It will be appreciated, however, that other types of sensor could be used. The output of the transducer is representative of the overall length of the detector arrangement between the point at which the bar 2d is anchored to the slat 1d and the location of the transducer at any given time. The bar 2a is provided with a collar 6 forming an abutment for a spring 7 which is arranged to apply a biassing force to the bar 2a, urging the bars 2a, 2b and 2c towards the bar 2d.

In the arrangement of FIGS. 5 to 7, the bars 2 are located beneath or within the slats 1, and each end plate 3 abuts an end plate 3 of an adjacent bar 2 at a position aligned with an intersection between adjacent ones of the slats 1.

In use, when no skew condition is present, then the bars 2 extend coaxially and the central flat regions 3a of the abutting end plates 3 engage one another. In this condition the assembly of bars 2 has a first overall effective length, and the bar 2a is positioned such that the sensor 5 outputs a first signal representative of this length.

Should a skew condition arise, as a result of the failure of one of the actuators associated with one of the slats 1 or a failure of the drive unit or transmission associated with one of the actuators, then the skewed position of the skewed slat will be transmitted through the brackets of that slat to the bar 2 which extends over that slat 1. The movement of the bar 2 associated with the skewed slat 1 will cause at least one of the end plates 3 thereof to move laterally resulting in the central flat region 3a of that end plate 3 moving out of engagement with the flat region 3a of the abutting end plate, and instead in engagement occurring between the chamfered regions 3b of the end plates 3, the spring 7 acting to ensure that engagement between the plates 3 is maintained. In such a condition, the overall effective length of the assembly is shorter than the first overall effective length, and the change in the overall effective length can be detected as the position occupied by the bar 2a will change, and so the output of the position sensor 5 will change.

The output of the position sensor 5 is conveniently supplied to a control computer which is arranged to shut down operation of the high lift leading edge system in the event that one of the slats becomes skewed by 5° or more, and to modify the flight controls accordingly.

The arrangement described hereinbefore is not particularly sensitive to failure of the actuator located at the inboard edge of the slat 1a or that of the actuator located at the outboard edge of the slat 1d, and so separate detector arrangements may be necessary in monitor the operation of these actuators.

Figure 8:
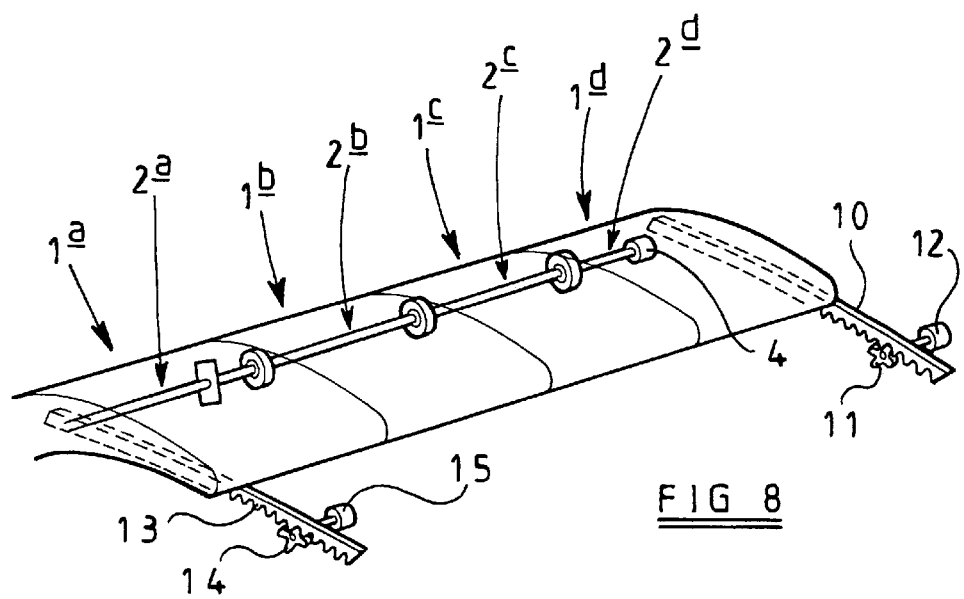
FIGS. 8 to 10 are views similar to FIGS. 5 to 7 illustrating an alternative embodiment.
Figure 9:
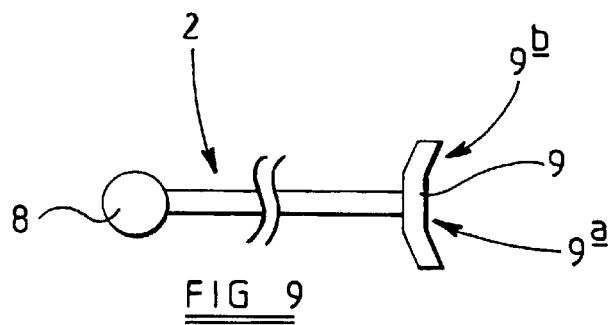
Figure 10:
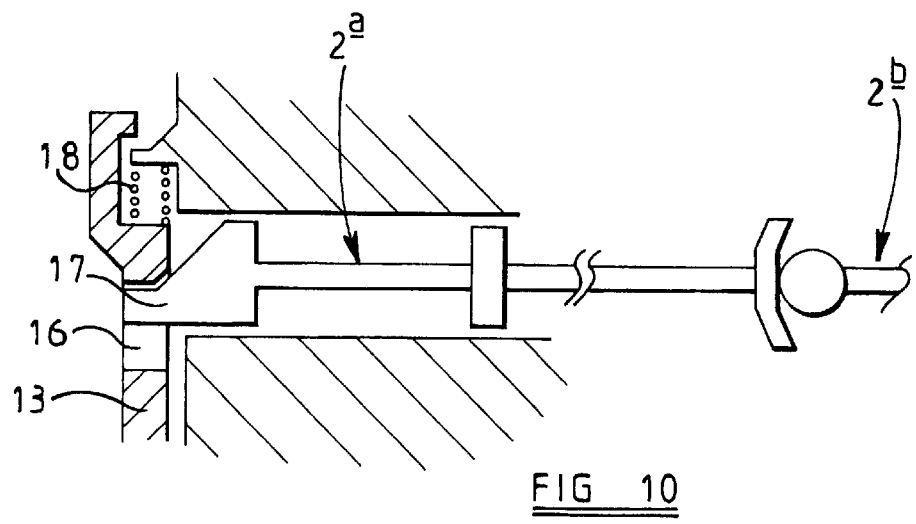

FIGS. 8 to 10 illustrate an alternative embodiment. In the embodiment of FIGS. 8 to 10, the end plates 3 of each bar 2 are replaced by a ball formation 8 and a socket formation in the form of a shallow cup 9. Each cup 9 includes a central region 9a surrounded by a ramped surface 9b. As in the arrangement described with reference to FIGS. 5 to 7, when no skew condition is present, the bars 2 are arranged coaxially and each ball formation 8 is located within the central region 9a of the associated cup 9. In the event that a skew condition arises, relative lateral movement will occur between one of the ball formations 8 and the associated cup 9 resulting in the ball formation 8 riding over the ramped surface 9b of the cup 9. Such movement increases the overall effective length of the assembly, and the increase of the overall effective length may be sensed using any suitable technique and used to indicate that a skew condition has arisen. For example, the change in the overall effective length of the assembly could be sensed using an arrangement similar to that of the embodiment of FIGS. 5 to 7.

Rather than use the sensor 5 of the embodiment of FIGS. 5 to 7, the embodiment of FIGS. 8 to 10 is designed to permit a skew condition arising from a failure of any of the actuators of the slats to be sensed using only two sensors. In the arrangement of FIGS. 5 to 10, the slat 1d is provided with sensor rack 10, rigidly mounted thereto, in addition to the two actuators used to drive the slat. The sensor rack 10 co-operates with a pinion 11, the rotary position of which is sensed by a sensor 12, for example in the form of a RVDT. The slat 1a is also provided with a sensor rack 13 which co-operates with a pinion 14 the position of which is sensed by a sensor 15, for example in the form of a RVDT. The sensor rack 13 is not rigidly mounted in position, but rather is slidable relative to the slat 1a. The sensor rack 13 is provided, as illustrated in FIG. 10, with an opening 16 into which a wedge member 17 extends, the wedge member 17 being carried by an end of the bar 2a. A spring 18 is engaged between the slat 1a and the sensor rack 13, biasing the sensor rack 13 towards the position illustrated in FIG. 10, this being the position occupied when a skew condition is not present.

Provided that the slats 1 are being moved correctly by their actuators, and hence no skew condition is present, then movement of the slats 1 between their extended and retracted positions will cause rotation of the pinion 11 and the pinion 14 through the same angle, the racks 10, 13 moving through the same distance, thus the output signals of the sensors 12, 15 should be identical.

If a skew condition arises as a result of the failure of either the actuator located adjacent the sensor rack 10 or the actuator located adjacent the sensor rack 13, then the sensor rack located adjacent the failed actuator will remain substantially stationary whilst the other sensor rack moves. As a result, the sensors will output different signals, and this difference can be used to indicate that a skew condition has arisen.

If a skew condition arises from the failure of one of the other actuators, then as described hereinbefore, the assembly will become of increased overall effective length. The increase in length will result in the wedge member 17 being forced to the left in the orientation illustrated, moving the sensor rack 13 relative to the slat 1a against the action of the spring 18. The movement of the sensor rack 13 will cause the pinion 14 to rotate through an angle other than the angle through which the pinion 11 is moved during the operation of extending or retracting the slats 1, and this difference can be used to indicate the presence of a skew condition.

As described hereinbefore, the detection of the presence of a skew condition can be used to shut down the high lift leading edge system and to modify the flight control system to compensate for the skew condition.

FIGS. 11 and 12 illustrate the four slats 20 of a high lift leading edge system of an aircraft wing that are located outboard of a wing mounted engine. Each slat 20 is mounted upon the wing in such a manner as to be moveable between an extended position as shown in FIG. 11 and a retracted position as shown in FIG. 12. The slats 20 are driven between these positions by a drive arrangement which includes a pair of actuators associated with each slat 20. The actuators may comprise rotary actuators, but in the illustrated arrangement comprise rack and pinion actuators 21. Each actuator 21 includes a toothed rack 22 rigidly mounted upon an associated slat 20, close to an edge thereof, and a wing mounted pinion 23 which co-operates with the associated rack 22 such that rotary motion of each pinion 23 drives the associated rack 22 and hence the slat 20 between its extended and retracted positions.

Figure 13:
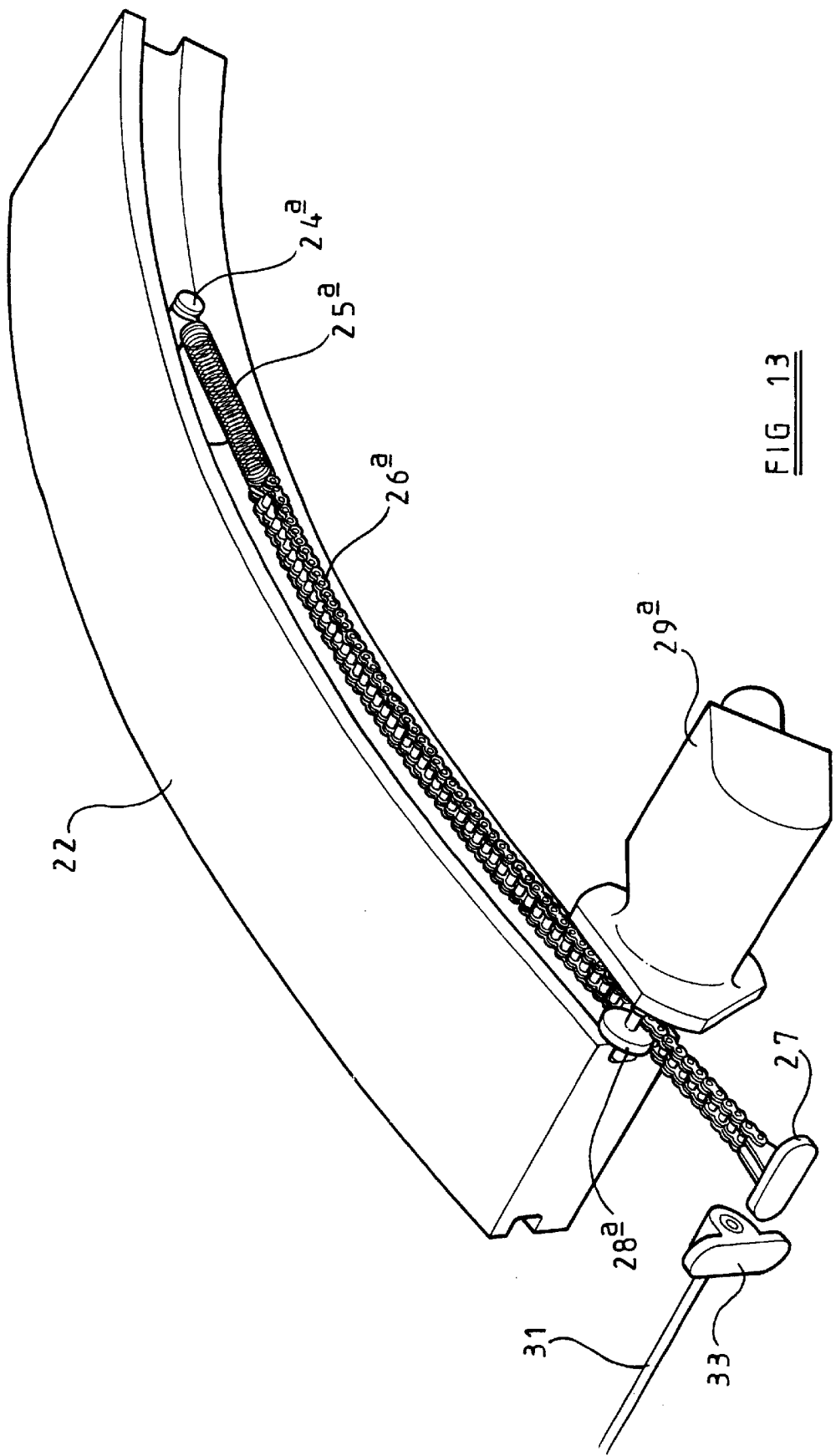
FIG. 13 is a perspective view of part of the skew detection system of FIG. 11.

For convenience, the slats 20 have been identified in FIG. 11 as 20a, 20b, 20c, and 20d. The outermost one of the racks 22 associated with the slat 20a is illustrated in FIG. 13 with the toothed surface lowermost so that the teeth are not visible. The rack 22 is provided with a projection 24a carrying a helical spring 25a. The spring 25a is connected to an end of a chain 26a, the other end of which is secured to a bracket 27 mounted upon the slat 20a. The chain 26a is formed of a plurality of links, each of which includes a cross member, the cross members together serving as the teeth of a rack with which a pinion 28a carried by an input shaft of a rotary position sensor 29a is co-operable. The spring 25a serves to tension the chain 26a. The rotary position sensor 29a is carried by an arm 30 rigidly mounted upon the aircraft wing.

In use, upon driving the racks 22 to move the slats 20 between their extended and retracted positions, the chain 26a will be drawn past the sensor 29a causing rotation of the pinion 28a, and as a result a signal will be produced by the sensor 29a indicative of the position occupied by the rack 22 with which the sensor 29a is associated.

The innermost one of the racks 22 associated with the slat 20d is also provided with a projection 24b carrying a spring 25b, the spring 25b being connected to an end of a chain 26b. The chain 26b, rather than being connected to a bracket 27, is secured to an end of an elongate, flexible member in the form of a cable 31. The cable 31 extends around a member 32 or pulley carried by the slat 20d, and extends across the slats 20. The end of the cable 31 remote from the chain 26b is secured to a bracket 33 mounted upon the slat 20a adjacent the bracket 27.

As illustrated in FIGS. 11 and 12, the slats 20 are provided with tubular guide members 34 through which the cable 31 extends. The guide members 34 are located close to the edges of adjacent ones of the slats 20.

The chain 26b serves as a rack with which a pinion 28b co-operates, the pinion 28b being mounted upon the input shaft of a rotary position sensor 29b. As described hereinbefore, movement of the rack 22 with which the sensor 29b is associated causes movement of the chain 26b which rotates the pinion 28b and accordingly a signal is produced indicative of the position of the rack 22.

In normal use, when the slats 20 are being driven from their retracted positions illustrated in FIG. 12 to their extended positions illustrated in FIG. 11, provided all of the actuators 21 are operating correctly, then the chains 26a, 26b will be drawn past the sensors 29a, 29b at the same speed and the output signals of the sensors 29a, 29b will indicate that the associated racks 22 have moved through the same distance.

Should the actuator, of which the rack 22 associated with the sensor 29d forms part, fail whilst the remaining actuators 21 continue to operate correctly, then the sensor 29a will produce a signal indicating that the associated rack 22 has not moved or has not moved by the same distance as the rack associated with the sensor 29b, and the difference between the position signals output by the sensors 29a, 29b can be used to indicate that a skew condition has occurred. Likewise, if the actuator of which the rack 22 associated with the sensor 29b forms part fails whilst the other actuators continue to operate correctly, a difference will occur between the positions sensed by the sensors 29a, 29b which can be used to indicate that a skew condition has arisen.

In the event that one of the actuators 21 other than either the innermost or outermost actuators fails whilst the other actuators 21 continue to operate, then a skew condition, for example as illustrated diagrammatically in FIG. 15, will occur. As illustrated in FIG. 15, the occurrence of a skew condition results in the cable 31 being pulled, by the guide members 34, away from the substantially straight configuration illustrated in FIGS. 11 and 12, and as a result, the chain 26b is pulled past the sensor 29b by a small distance against the action of the spring 25b. As a result, the position signal output by the sensor 29b will differ from that output by the sensor 29a and the difference can be used to trigger a warning signal and to modify the aircraft control system to compensate for the presence of the skew condition.

It will be appreciated that the skew detection system permits the detection of a skew condition in any of the slats using only two sensors. The sensors may, if desired, also be used to provide position information for use in controlling the operation of the leading edge system.

Although in the description hereinbefore the pinions are mounted upon the input shafts of the sensors, it will be appreciated that, if desired, a suitable reduction gearbox could be provided between each pinion and the associated sensor.

Depending upon the application, small levels of skew may be tolerated, thus the skew detection system may be arranged such that a warning signal and/or flight control adjustments are only produced or made when the skew exceeds, for example 3%. However, it will be appreciated that, depending upon the control surface design or upon operating conditions, a greater or lesser level of skew may be acceptable.

Although the description hereinbefore relates only to the detection of a skew condition resulting from the failure of a single actuator, in the event that the drive to several of the actuators fails and a skew condition or asymmetry condition arises, this will also be detected by the system.

It will be appreciated that modifications may be made to the system described hereinbefore. For example, one or more of the chains could be replaced with a rigid rack secured either rigidly or slidably, depending upon which sensor it is associated with, to the associated slat.

The description hereinbefore is of the use of the skew detection system with a high lift leading edge system. The invention is also suitable for use in other control surface systems, for example with the trailing edge flats of an aircraft wing.

We claim:

1. A skew detection system for use with a control surface system having a plurality of control surfaces located adjacent one another, the skew detection system comprising a first sensor operable to monitor the position of part of one of the surfaces, and a second sensor operable to monitor the position of part of another of the surfaces, the second sensor further being sensitive to the occurrence of a skew condition at locations between the said parts of the surfaces.

2. A system as claimed in claim 1, wherein each sensor comprises a rotary position sensor arranged to be driven by movement of the associated surface.

3. A system as claimed in claim 2, wherein each position sensor includes a pinion arranged to be driven by a rack carried by the surface.

4. A system as claimed in claim 3, wherein the rack associated with the second sensor is movable relative to the associated control surface such movement occurring in the event of the occurrence of a skew condition intermediate the parts of the surfaces with which the sensors are associated so that the second sensor is sensitive to the occurrence of such a skew condition.

5. A skew detection system for use in sensing the occurrence of a skew condition in a system having a plurality of control surfaces located adjacent one another and which, in use, are driven to move simultaneously and at the same speed as one another, the skew detection system comprising a detector arrangement extending over and moveable with the surface between a first location of one of the surfaces and a second location on another of the surfaces, at least part of the detector arrangement being arranged to move in the event that one or more of the surfaces become skewed, and a sensor arranged to permit a change in the position of the said part of the detector arrangement to be detected, wherein the detector arrangement comprises a plurality of elements arranged in end-to-end configuration co-operating with one another such that the axial position of at least one of the elements changes in the event of a skew condition.

6. A system as claimed in claim 5, wherein the elements have end surfaces provided with chamfered regions.

7. A system as claimed in claim 5, wherein the elements co-operate with one another through ball and socket arrangements.

8. A system as claimed in claim 5, wherein the elements are spring biased towards one another.

9. A system as claimed in claim 5, wherein the sensor is located to sense the position of an end one of the elements.

10. A skew detection system for use with a control surface system having a plurality of control surfaces located adjacent one another, the skew detection system comprising a first sensor operable to monitor the position of part of one of the surfaces, and second sensor operable to monitor the position of part of another of the surfaces, the second sensor further being sensitive to the occurrence of a skew condition at locations between the said parts of the surfaces, each sensor comprising a rotary position sensor arranged to be driven by movement of the associated surface, each postion sensor including a pinion arranged to be driven by a rack in the form of a chain carried by the surface.

11. A skew detection system for use with a control surface system having a plurality of control surfaces located adjacent one another, the skew detection system comprising a first sensor operable to monitor the position of part of one of the surfaces, and a second sensor operable to monitor the position of part of another of the surfaces, the second sensor further being sensitive to the occurrence of a skew condition at locations between the said parts of the surfaces, each sensor comprising a rotary position sensor arranged to be driven by movement of the associated surface, each position sensor including a pinion arranged to be driven by a rack carried by the surface, wherein the rack associated with the second sensor is moveable relative to the associated control surface, such movement occurring in the event of the occurrence of a skew condition intermediate the parts of the surfaces with which the sensors are associated so that the second sensor is sensitive to the occurrence of such a skew condition, and wherein an elongate flexible member is provided, the member extending across all of the control surfaces with which the detection system is used, the member being guided adjacent the edges of each control surface, and being coupled to the rack associated with the second sensor to cause movement of the rack associated with the second sensor relative to the associated control surface in the event of a skew condition arising.

12. A system as claimed in claim 11, wherein the elongate flexible member comprises a cable.

13. A system as claimed in claim 12, wherein the cable is guided by extending through tubular guide members located adjacent the edges of the control surfaces.

14. A skew detection system for use with a control surface system having a plurality of control surfaces located adjacent one another, the skew detection system comprising a first sensor operable to monitor the position of part of one of the surfaces, and a second sensor operable to monitor the position of part of another of the surfaces, the second sensor further being sensitive to the occurrence of a skew condition at locations between the said parts of the surfaces, each sensor comprising a rotary position sensor arranged to be driven by movement of the associated surface, each position sensor including a pinion arranged to be driven by a rack carried by the surface, wherein the rack associated with the second sensor is moveable relative to the associated control surface, such movement occurring in the event of the occurrence of a skew condition intermediate the parts of the surfaces with which the sensors are associated so that the second sensor is sensitive to the occurrence of such a skew condition, and further comprising a detector arrangement in the form of a plurality of members arranged in end-to-end configuration extending over the surfaces and co-operable with one another such that, in the event of a skew condition arising, at least one of the members moves axially, the axial movement causing movement of the rack associated with the second sensor.

\* \* \* \* \*